June 28, 1938.  A. A. HODGKINS  2,121,874
SERVO-MOTOR
Original Filed April 9, 1931
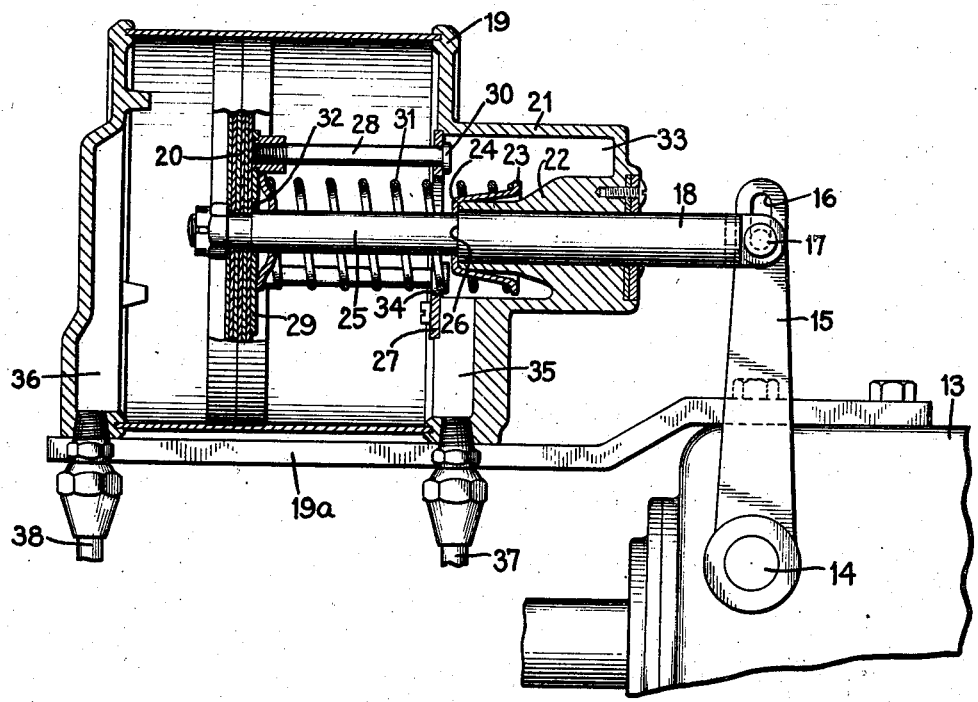
INVENTOR
ALBERT A. HODGKINS
BY Orton and Griswold
ATTORNEY Patented June 28, 1938

2,121,874

UNITED STATES PATENT OFFICE 2,121,874

SERVO-MOTOR

Albert A. Hodgkins, Providence, R. I., assignor to Universal Gear Shift Corporation, New York, N. Y., a corporation of Delaware Original application April 9, 1931, Serial No. 528,840, now Patent No. 2,023,229, dated December 3, 1935. Divided and this application October 17, 1935, Serial No. 45,405

1 Claim. (Cl. 121—38)

This invention relates to control mechanism for reverse gearing and more particularly to reverse gearing of the type ordinarily used in connection with marine engines, such as motor boat engines and the like. It is usual to provide in the drive mechanism between the engine and propeller of a motor boat what is commonly known as a reverse gear so constructed that the operator of the boat by means of a control lever may set the gear for forward drive, for neutral in which position the engine idles without actuating the propeller, or for reverse drive as is desired.

In many instances and particularly in the cabin type of boats, the engine is often placed beneath the floor of the bridge deck and a system of levers and links connects the reverse gear mechanism with a control stand or box on the bridge deck so that the gear may be controlled from this point. When control of the gear is effected from a remote point in this way, the result is that the connections will naturally offer some resistance to the movement of the control lever due to their weight and to friction between the moving parts, and the shifting of the control lever is attended with some difficulty. In addition, the connections between the control lever and the reverse gear must be disposed in more or less of a direct line and cannot always be placed in positions where they will not interfere with the use of the boat.

One object of the invention is to provide a controlling device for reverse gearing which may be operated with great facility and which will require the exertion of very little energy on the part of the operator.

Another object of the invention is the provision of a control mechanism for reverse gears which may be operated by fluid pressure, and preferably will be pneumatically operated by means of reduced air pressure or partial vacuum obtained from the engine manifold of an internal combustion engine.

A still further object of the invention is the provision of a reverse gear control mechanism of this character so constructed that the controls therefor may be mounted in the ordinary control box used in connection with reverse gears which are manually controlled.

Another object of the invention is to provide a novel remote control actuating device for a gear mechanism such that the device will operate positively and efficiently and the mechanism of which may be mounted within a relatively small space and in such locations that no obstructions will be offered to the use of the space in the boat.

These and other objects of the invention and the means for their attainment will be more apparent from the following detailed specification, taken in connection with the accompanying drawing illustrating one embodiment by which the invention may be realized, and in which the actuating cylinder and piston are shown in longitudinal, vertical section for controlling the reverse gearing.

To illustrate a preferred embodiment of my invention, I have shown in the drawing a portion of a power source such as an internal combustion engine provided with a housing 13 within which is located the usual reverse gear mechanism. Projecting from this housing is a rock shaft 14 upon which is secured a rock arm 15. It will be understood that, as is usual in the construction of such devices, the rock arm 15 will have a neutral position wherein the propeller will not be actuated by the engine and that when the arm is rocked in one direction from this position, such as for instance to the left as shown, the propeller will be turned in such a direction as to drive the boat ahead, and when moved from the neutral position to the right, as shown, the direction of the propeller will be reversed. As shown, the neutral position will obtain when the rock arm 15 is in a substantially upright position, although this arrangement may be varied as desired.

The arm 15 is provided at its upper end with a slot 16 within which loosely rests a pin 17 carried by a piston rod 18, which rod projects from the cylinder 19 and has mounted thereon within the cylinder a piston 20, the relation being such, that as the piston is moved in one direction or the other in the cylinder from an intermediate position, the arm 15 will be rocked to the right or left, as shown. The cylinder 19 may be supported upon the gear housing 13 by means of a bracket 19ª.

At one end of the cylinder is provided a hollow boss 21 within which is a thimble 22 surrounding the piston rod 18, the end of which thimble acts as a stop for a spring shoe 23. This spring shoe is provided with an inturned portion 24 at one end which surrounds a reduced portion 25 of the piston rod, so that when the piston moves in one direction, the shoe will be picked up and moved with it by the shoulder 26 provided at the end of the reduced portion 25.

Secured at one end of the cylinder is a supporting plate 27 through openings in which pass a number of bolts 28, the bolts having secured upon their ends a plate 29. The opposite ends of the bolts are provided with enlarged heads 30 which limit their movement in one direction through the plate 27. A spring 31 surrounds the piston rod within the cylinder and bears at one end against the spring shoe 23 and at the other end against the plate 29. The latter plate, while resting against the piston 20, is not secured thereto, and is also provided with a central opening 32 through which the reduced portion 25 of the piston rod moves freely. It will be understood, however, that the plate 29 will be moved to the right by the piston when the latter moves in this direction from the intermediate position shown, and at this time the bolts 28 secured to the plate 29 will move to the right through the openings in the plate 27 into the hollow portion 33 of the boss 21. The spring 31 passes freely through an opening 34 in the plate 27 so that its end bears against the shoe 23.

The ends of the cylinder 19 are provided with fluid passages 35 and 36 which are connected respectively with tubes or pipes 37 and 38, by which fluid under pressure or vacuum may be introduced into the cylinder upon either side of the piston.

It will be understood that the spring 31 tends to maintain the piston in the position shown in the drawing, and will so maintain the piston except when the force of the spring is overcome by the force of fluid pressure within the cylinder. If, for instance, the pipe 37 is in communication with a source of vacuum or reduced air pressure, and the pipe 38 is vented to the atmosphere, the piston 20 will move to the right, as shown, against the action of the spring and will compress the spring against the shoe 23, the bolts 28 moving into the chamber 33. If, now, the pipe 37 is vented to the atmosphere, the spring will return the piston to its original position. When the pipe 38 is in communication with a source of reduced air pressure and 37 vented to the atmosphere, the piston will be moved to the left from its intermediate position. During this movement the shoulder 26 on the piston rod picks up the shoe 23 and compresses the spring against the plate 29 which is held against movement to the left by the bolts 28, and the spring is thus compressed in the opposite direction so as to again return the piston 20 to its intermediate position when the pipe 38 is vented to the atmosphere.

This application is a divisional application of United States Patent No. 2,023,229 dated December 3, 1935.

Various modifications will occur to those skilled in the art in the configuration, composition and disposition of the component elements going to make up the invention as a whole as well as in the use to which the invention is put, and no limitation is intended by the phraseology of the foregoing description or illustrations in the accompanying drawing, except as indicated in the appended claim.

What is claimed is:

Pneumatic controlling means for a gear mechanism comprising a cylinder, a piston movable therein, a piston rod connected to the piston and operatively connected with the gear mechanism, a spring surrounding the piston rod within the cylinder, an abutment for the spring mounted at the end thereof adjacent the piston, a second abutment mounted at the other end of the spring, bolts connected with the first named abutment and guided for sliding movement, and means for effecting movement of the first abutment by the piston when it is moved in one direction, means carried with the bolts to limit movement of said first abutment in the opposite direction, means effecting movement of the other abutment by the piston rod when the piston is moved in the other direction, and means to limit movement of said second named abutment in the opposite direction, the movement of said abutments acting to tension the spring to center the piston after its movement in either direction.

ALBERT A. HODGKINS.